(12) United States Patent
Chao et al.

(10) Patent No.: US 8,185,247 B2
(45) Date of Patent: May 22, 2012

(54) METHOD AND SYSTEM FOR CONTROLLING COMPRESSOR

(75) Inventors: Ling-Yu Chao, Taichung (TW); Chung-Che Liu, Hsinchu (TW); Hsu-Cheng Chiang, Hsinchu (TW)

(73) Assignee: Industrial Technology Research Institute, Zhudong Town (TW)

( * ) Notice: Subject to any disclaimer, the term of this patent is extended or adjusted under 35 U.S.C. 154(b) by 291 days.

(21) Appl. No.: 12/540,566

(22) Filed: Aug. 13, 2009

(65) Prior Publication Data

US 2010/0211228 A1 Aug. 19, 2010

(30) Foreign Application Priority Data

Feb. 13, 2009 (TW) ................................ 98104771 A

(51) Int. Cl.
*G06F 19/00* (2006.01)
(52) U.S. Cl. ............... 700/282; 700/276; 62/90; 62/181
(58) Field of Classification Search .................. 700/276, 700/282; 62/90, 181
See application file for complete search history.

(56) References Cited

U.S. PATENT DOCUMENTS

| | | | | |
|---|---|---|---|---|
| 4,984,433 A * | 1/1991 | Worthington | ...................... | 62/90 |
| 5,145,317 A | 9/1992 | Brasz | ......................... | 415/224.5 |
| 5,193,352 A * | 3/1993 | Smith et al. | ....................... | 62/90 |
| 6,499,504 B2 * | 12/2002 | Wichert | .................... | 137/565.13 |
| 6,792,766 B2 * | 9/2004 | Osborne et al. | .................. | 62/159 |
| 2005/0223724 A1 | 10/2005 | Crane et al. | ...................... | 62/175 |
| 2006/0060246 A1 * | 3/2006 | Schuetze et al. | .............. | 137/488 |
| 2006/0090459 A1 * | 5/2006 | Devier et al. | .................... | 60/422 |
| 2006/0219965 A1 * | 10/2006 | Hirota | ......................... | 251/30.02 |
| 2008/0041076 A1 * | 2/2008 | Tutunoglu et al. | .............. | 62/181 |
| 2008/0173260 A1 * | 7/2008 | Lange | .......................... | 122/31.1 |

FOREIGN PATENT DOCUMENTS

| | | |
|---|---|---|
| JP | 2002-322996 | 8/2002 |
| JP | 2008-241238 | 9/2008 |
| WO | 02/44632 | 6/2002 |

* cited by examiner

*Primary Examiner* — Michael D Masinick

(74) *Attorney, Agent, or Firm* — Allen, Dyer, Doppelt, Milbrath & Gilchrist, P.A

(57) ABSTRACT

In the present invention, a method and a system for controlling a compressor are provided. The method includes the steps of: providing a condenser connected to the compressor, and at least one evaporator connected to the condenser; measuring an inlet pressure and an outlet pressure of the compressor to obtain a flow rate of the condensate; determining a secure flow rate and a demanding flow rate based on a total number of the at least one evaporator; comparing at least two of the flow rate, the demanding flow rate and the secure flow rate with each other to obtain a compared result; and controlling the compressor based on the comparing result.

17 Claims, 4 Drawing Sheets

METHOD AND SYSTEM FOR CONTROLLING COMPRESSOR

FIELD OF THE INVENTION

The present invention relates generally to a method and a system for controlling, and more particularly to a method and a system for controlling a compressor in a heating-exchanging system.

BACKGROUND OF THE INVENTION

Nowadays, using a compressor in the heating-exchanging system is essential in modern life. Compressor-manufacturers are often concerned on how to control high power compressor for the sake of extending the life of span and saving energy thereof.

For example, most of the centrifugal compressors using in central air conditioning utilize centrifugal chillers, that own large refrigerating effect for chilling large space like office building, factory, hotel and indoor stadium etc. The chilled water is cooled via evaporators and transmits the heat to the liquid refrigerant. The liquid refrigerant would become gaseous state after absorbing the heat. The gaseous refrigerant is compressed by the compressor and then transported to the condenser to engage heating-exchanging. Finally, the liquid refrigerant absorbs the heat from the chilled water. The chilled water is re-circulated back to the chiller to be cooled again.

Most of the controlling systems are for the chiller of central air conditioning, but the controlling systems have simpler controlling methods, such as redesigning the structure of the compressor (U.S. Pat. No. 5,145,317) or adjusting the rotor speed of the compressor (WO0244632). Moreover, the chiller of central air conditioning is gradually replaced by air conditioning only using the refrigerant for heating-exchanging without cooled water. Using the centrifugal compressor and the refrigerant in air conditioning has a problem regarding how to save energy and to prevent surge and exchange the heat at higher loading situation. Because manufacturers only incline to have concerns about the technique controlling the compressor but neglect that the technique shall be correspondingly adjusted with respect to different circumstances, the integrated controlling method is needed to be provided.

Accordingly, a method and a system for controlling a compressor to solve the above-mentioned problems are developed. The inventors purpose to rectify those drawbacks and provide the method and the system for controlling the compressor that control the flow rate based on the needs of the system to make the compressor and the heating-exchanging system prevent surge and save energy.

SUMMARY OF THE INVENTION

In accordance with one aspect of the present invention, a method and a system for controlling a compressor are provided. The method and the system for controlling the compressor of the present invention can save energy, prevent surge and raise efficient. The present invention controls the heating-exchanging system based on the total number of evaporators, the performance of the compressor, the pressure of the compressor and the pressure of the condenser.

In accordance with another aspect of the present invention, a method and a system for controlling a compressor are provided. The method for controlling the compressor having a condensate, including the steps of: providing a condenser connected to the compressor, and at least one evaporator connected to the condenser; measuring an inlet pressure and an outlet pressure of the compressor to obtain a flow rate of the condensate; determining a secure flow rate and a demanding flow rate based on a total number of the at least one evaporator; comparing at least two of the flow rate, the demanding flow rate and the secure flow rate with each other to obtain a compared result; and controlling the compressor based on the comparing result.

Preferably, the method for controlling the compressor wherein the compressor and the condenser connect a condensate storage having a controlling valve and further includes a step of adjusting the controlling valve based on the compared result.

Preferably, the method for controlling the compressor further includes a step of raising a rotor speed of the compressor if the flow rate of the condensate is lower than the demanding flow rate.

Preferably, the compressor has an inlet guide vane and connects to a hot gas bypass, and the method further includes the steps of: adjusting the inlet guide vane if the demanding flow rate of the condensate is higher than the secure flow rate; and adjusting the hot gas bypass if the flow rate is higher than the demanding flow rate.

Preferably, the method for controlling the compressor further includes the steps of: measuring a condenser temperature and obtaining a condenser pressure according to the inlet pressure, the outlet pressure and the condenser temperature; and lowering a rotor speed of the compressor if the demanding (i.e., desired) flow rate is lower than the secure (i.e., minimum acceptable) flow rate and the outlet pressure is higher than the condenser pressure.

Preferably, the condenser has a coil valve and a fan, and the method further includes a step of adjusting the coil valve and a speed of the fan if the outlet pressure is higher than the condenser pressure.

In accordance with a further aspect of the present invention, a method for controlling a compressor in a heating-exchanging system having a condensate is provided. The method includes the steps of: measuring a flow rate of the condensate; comparing the flow rate with a controlling parameter to obtain a compared result; and controlling the compressor based on the compared result.

Preferably, the flow rate is obtained by measuring an inlet pressure and an outlet pressure of the compressor.

Preferably, the heating-exchanging system includes an evaporator and a condenser connected to the compressor.

Preferably, the controlling parameter is obtained by determining a demanding flow rate and a secure flow rate.

Preferably, the heating-exchanging system includes a condenser and at least one evaporator connected to the compressor and the condenser, and the demanding flow rate is determined based on a total number of the at least one evaporator.

In accordance with further another aspect of the present invention, a compressor controller in a heating-exchanging system having a compressor and a condensate is provided. The compressor controller includes: a measurer measuring a flow rate of the condensate; and a determining device determining a demanding flow rate and a secure flow rate, wherein the compressor is controlled based on the flow rate, the demanding flow rate and the secure flow rate.

Preferably, the compressor controller further including a comparer comparing the flow rate of the condensate and one of the demanding flow rate and the secure flow rate to obtain a compared result, based on which the compressor is controlled.

Preferably, the measurer further measures an inlet pressure, an outlet pressure and a condenser temperature, a condenser pressure is obtained according to the inlet pressure, the outlet pressure and the condenser temperature, and a rotor speed of the compressor is lowered if the desired flow rate is lower than the minimum acceptable flow rate and the outlet pressure is higher than the condenser pressure.

Preferably, the compressor has an inlet guide vane and connects to a hot gas bypass.

Preferably, the compressor connects to an inverter and the inverter connects to the controller.

Preferably, the heating-exchanging system includes a condenser and at least one evaporator connected to the compressor and the condenser.

Preferably, the condenser has a coil valve and a fan.

Preferably, the compressor and the condenser connect a condensate storage having a controlling valve.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
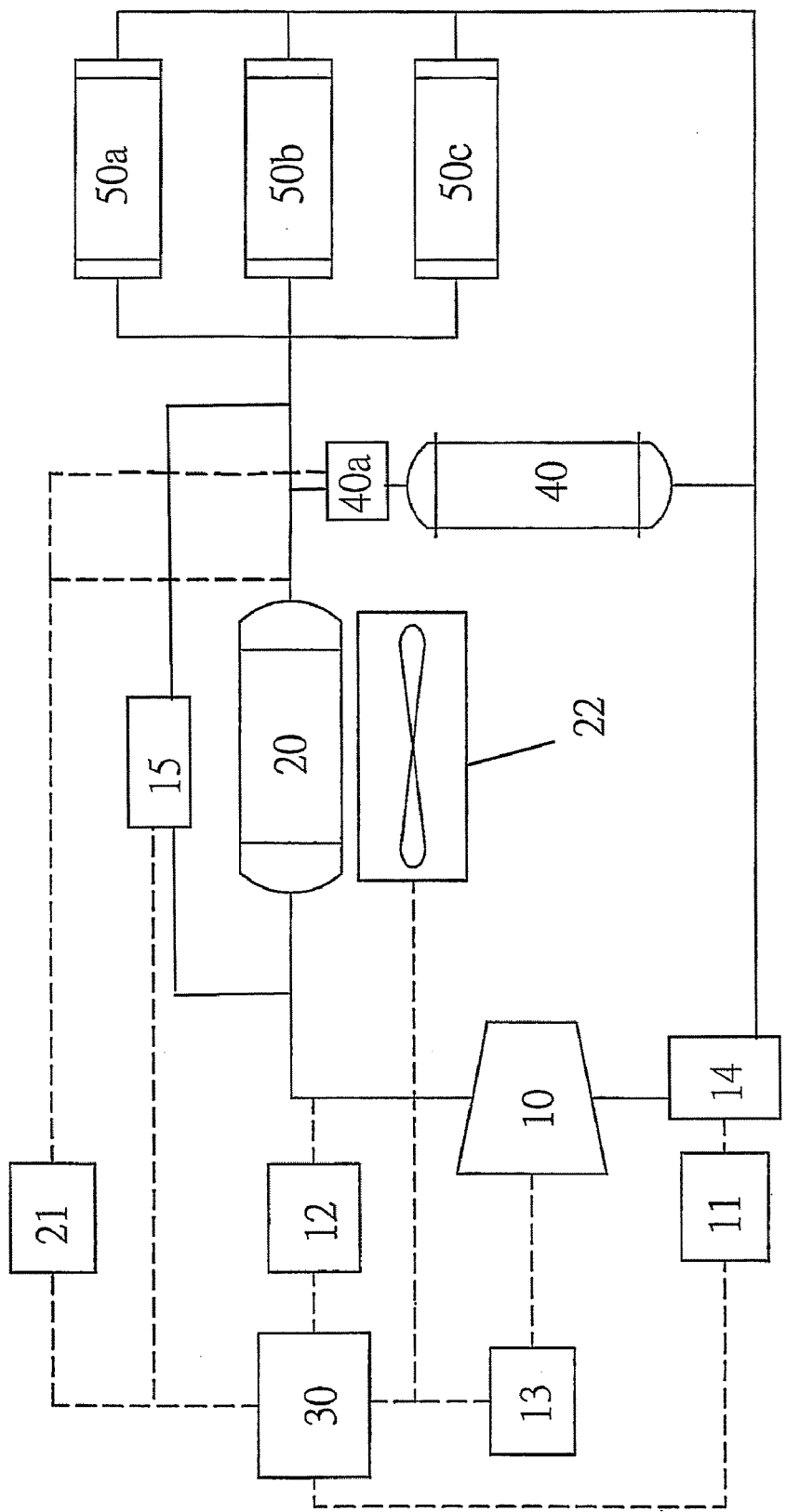
FIG. 1 shows a block diagram of the system for controlling compressor according to a first preferred embodiment of the present invention.

Please refer to FIG. 1, which shows a block diagram of the system for controlling a compressor according to a first preferred embodiment of the present invention. The system includes a compressor 10, a inlet pressure gauge 11, a outlet pressure gauge 12, a inverter 13, a condenser 20, a temperature gauge 21, a fan of the condenser 22, a controller 30, a condensate storage 40, a evaporator 50a (50b, 50c). In FIG. 1, a solid line is a condensate piping connected to the compressor 10, the condenser 20, the condensate storage 40 and the evaporator 50a (50b, 50c). A dotted line is a signal line connected to the inlet pressure gauge 11, the outlet pressure gauge 12, the inverter 13, a temperature gauge 21, the fan of the condenser 22 and a controller 30.

The inlet pressure gauge 11 and the outlet pressure gauge 12 may measure an inlet pressure Pi and an outlet pressure Po of the compressor. The inlet pressure gauge 11 and the outlet pressure gauge 12 may transmit the inlet pressure Pi and the outlet pressure Po to the controller 30. The compressor 10 connects the inverter 13 and the inverter 13 connects the controller 30. The controller 30 may input a controlling signal to control the inverter 13 for adjusting a rotor speed of the compressor to control a flow rate of the condensate. The compressor 10 according to the first preferred embodiment of the present invention is a positive displacement compressor, such as a centrifugal compressor. The compressor 10 may also include a centrifugal compressor, a scroll compressor, a screw compressor, and a rotary compressor.

The condenser 20 is connected to the compressor 10, wherein the condensate pipe is connected between the condenser 20 and the compressor 10 to carry the condensate (such as a refrigerant). The gaseous condensate with relatively higher temperature and relatively higher pressure from the compressor 10 is carried to the condenser 20 for heating-exchanging and becomes the gaseous condensate with relatively middle temperature and relatively higher pressure. The temperature gauge 21 is disposed in the outlet pipe of the condenser 20 for measuring the condensate temperature to obtain a condenser temperature Tc. The temperature gauge 21 may output a signal of Tc to the controller 30. The condenser 20 has a fan 22 connected to the controller 30 for receiving the controlling signal from the controller 30 to adjust a speed of the fan and adjusting the condenser temperature Tc.

The condenser 20 includes a plurality of coils and has a coil valve connected to the controller 30 for receiving the controlling signal from the controller 30. The controller 30 may open/close the coil valve to raise/lower the total number of the functioning coils from 10 up to 20 or down to 8 for changing the performance of the condenser 20 to adjust the condenser temperature Tc.

The condensate outputting from the condenser 20 becomes the liquid condensate with relatively lower temperature and relatively lower pressure through an expansion valve or other reduced pressure devices (not shown in FIG. 1), and is carried to the evaporator 50a (50b, 50c) or more evaporators for heating-exchanging. The condensate absorbing heat from the evaporators is carried to the compressor 10 and a heat cycle of the system is completed.

The pipe between the condenser 20 and the evaporators may be disposed a condensate storage 40 connected to the pipe between the compressor 10 and the evaporator. The condensate storage 40 having a controlling valve 40a connected to the controller 30. The condensate storage 40 may storage or release the condensate based on the controlling signal of the controller 30 to adjust the flow rate of the condensate. The system for controlling compressor of the present invention may be disposed a hot gas bypass 15 connected to the controller 30. The hot gas bypass 15 may be dispose on a bypass pipe, such as the bypass pipe connected to the outlet of the compressor and of the evaporators. The hot gas bypass 15 may open the bypass pipe based on the controlling signal of the controller 30, and the condensate in the high-pressure side pipe may be carried to the low-pressure side pipe to control the flow rate.

The controller 30 is connected to the inlet pressure gauge 11, the outlet pressure gauge 12 and a temperature gauge 21 for measuring and receives the inlet pressure Pi, the outlet pressure Po and a condenser temperature Tc. The controller 30 may calculate the flow rate Qa based on the inlet pressure Pi and the outlet pressure Po. The controller 30 may calculate a condenser pressure Pc based on the condenser temperature Tc and the condenser pressure Pc may be measured by disposing a condenser pressure gauge. The controller 30 may compare the flow rate Qa with a controlling parameter to obtain a compared result and controls the compressor based on the compared result.

Moreover, the system for controlling the compressor of the present invention may have a compressor controller 30a including a measurer 31, a determining device 32 and a comparer 33. Please refer to FIG. 2, which shows a block diagram of the heating-exchanging system for controlling the compressor according to a second preferred embodiment of the present invention. The measurer 31 can measure a flow rate of the condensate and also may measure the inlet pressure Pi, the outlet pressure Po, a condenser temperature Tc and the condenser pressure Pc. The determining device 32 may determine a demanding flow rate and a secure flow rate of controlling parameters, wherein the compressor is controlled based on the flow rate Qa, the demanding flow rate Qd and the secure flow rate Qm, or based on the inlet pressure Pi, the outlet pressure Po, the condenser temperature Tc and the condenser pressure Pc. The comparer 33 may compare the flow rate Qa of the condensate and one of the demanding flow rate Qd and the secure flow rate Qm to obtain a compared result, based on which the compressor is controlled.

Figure 2:
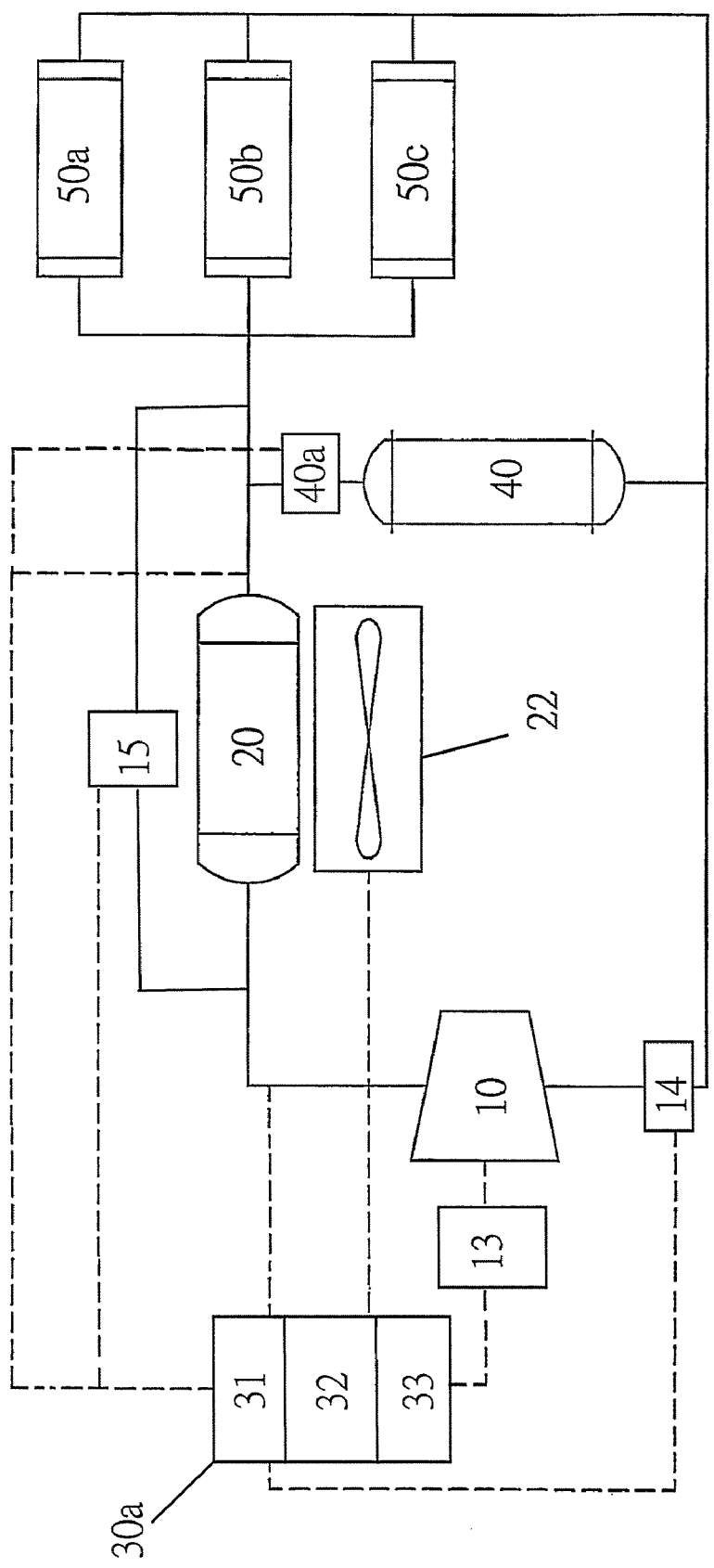
FIG. 2 shows a block diagram of the system for controlling compressor according to a second preferred embodiment of the present invention.

In FIG. 2, the compressor 10 has an inlet guide vane 14 and connects to a hot gas bypass 15. The compressor 10 further connects to an inverter 13 and the inverter 13 connects to the compressor controller 30a. The heating-exchanging system includes a condenser 20 and at least one evaporator 50a, 50b, 50c connected to the compressor 10 and the condenser 20. The condenser 20 has a coil valve and a fan 22. The compressor 10 and the condenser 20 connect a condensate storage 40 having a controlling valve 40a.

Furthermore, a controlling parameter may include the inlet pressure Pi, the outlet pressure Po, the condenser temperature Tc, the condenser pressure Pc, the flow rate Qa, the demanding flow rate Qd and the secure flow rate Qm. The demanding flow rate Qd and the secure flow rate Qm may be determined and respectively based on the total number of the evaporators and the performance of the compressor.

The method for controlling the compressor according to the preferred embodiment of the present invention may use the foregoing system or use an apparatus which can execute the method. The method for controlling a compressor having a condensate, including the steps of: providing a condenser connected to the compressor, and at least one evaporator connected to the condenser; measuring an inlet pressure and an outlet pressure of the compressor to obtain a flow rate Qa of the condensate; determining a demanding flow rate Qd and a secure flow rate Qm based on a total number of the at least one evaporator; comparing at least two of the flow rate Qa, the demanding flow rate Qd and the secure flow rate Qm with each other to obtain a compared result; and controlling the compressor based on the comparing result.

Furthermore, the method may comprise the step of comparing two of the controlling parameters to obtain a compared result for controlling if the method needs, such as comparing the outlet pressure Po and the condenser pressure Pc, comparing the flow rate Qa and the demanding flow rate Qd, comparing the secure flow rate Qm and the demanding flow rate Qd, or comparing the flow rate Qa and the secure flow rate Qm.

Because the flow rate Qa of the condensate, the inlet pressure Pi and the outlet pressure Po have a function relation, the flow rate Qa may be obtained according to the inlet pressure Pi and the outlet pressure Po. Moreover, the condenser temperature Tc and the condenser pressure Pc also have a function relation. If one of Tc and Pc is measured, the other of Tc and Pc may be obtainable.

Figure 3:
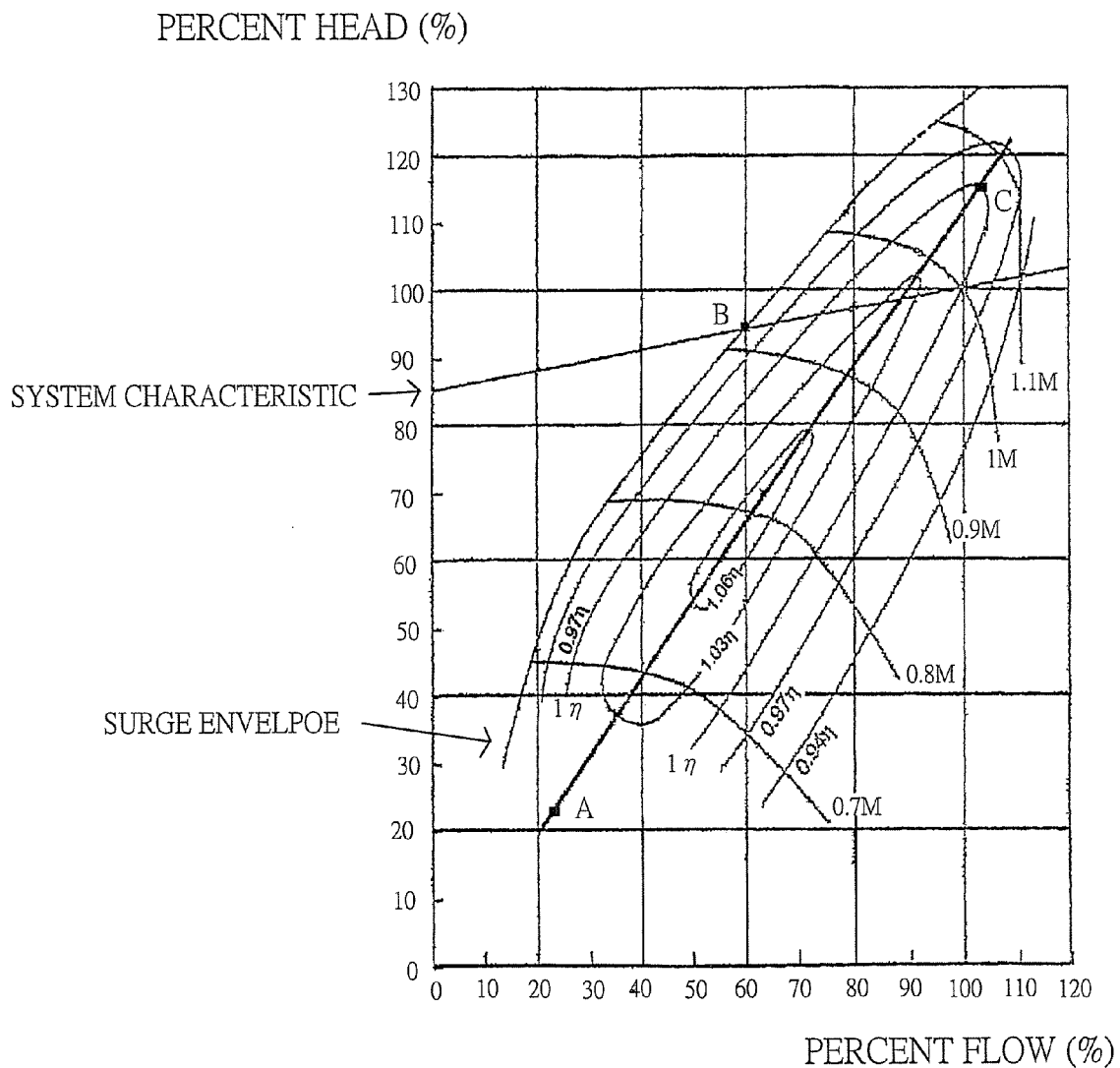
FIG. 3 shows a graph of the performance of the compressor according to the preferred embodiment of the present invention.
Figure 4:
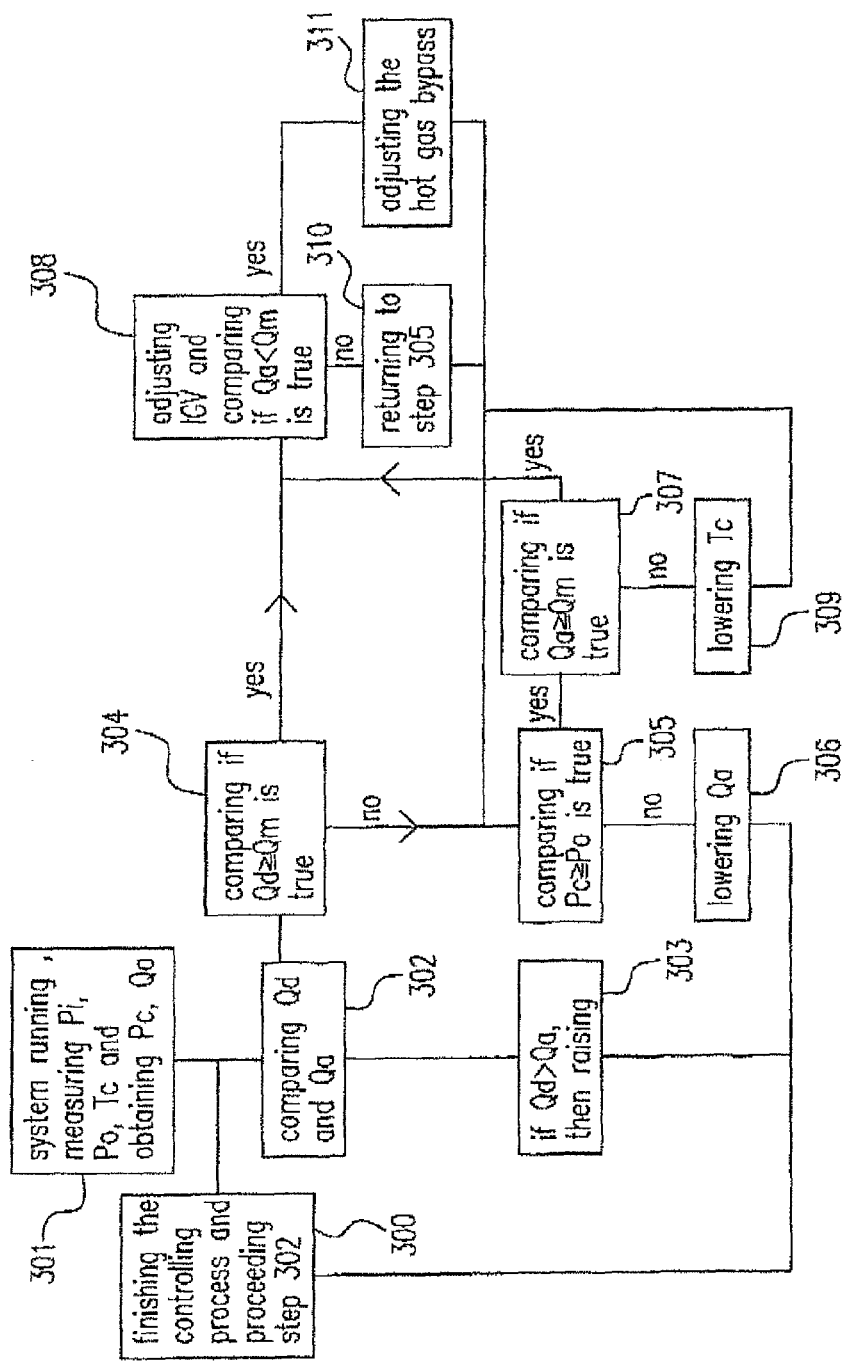
FIG. 4 shows a flowchart of the method for controlling the compressor in a heating-exchanging system according to the preferred embodiment of the present invention.

In the present invention, the secure flow rate Qm of the controlling parameters is determined based on the performance of the compressor, so each compressor having different performance may induce each different Qm. Please refer to FIG. 3, which shows a graph of the performance of the compressor according to the preferred embodiment of the present invention. The person having ordinary skill in the art should understand the graph for showing the performance of the compressor. In FIG. 3, the axis Y is the percentage of pressure head which means the changes of the outlet pressure Po in the fixed inlet pressure Pi. The axis X is the changes of the flow rate corresponding to the changes of the outlet pressure Po. A camber line extending via the point B shows the range of surge envelope. An oblique line extending via the point A represents the best performance (efficiency) of the compressor. A camber line 1η extending via the point C represents the preferred efficiency of the compressor. A camber line 1M represents the rotating speed of the compressor impeller, and its unit of measure is Mach. The secure flow rate Qm of the present invention is determined based on the range of surge envelope. In other words, the secure flow rate Qm is determined based on the best performance of the compressor.

The demanding flow rate Qd is determined according to the total number of the working evaporators. That is to say that the demanding flow rate Qd may change with the total number of the working evaporators. The method of the present invention may be suitable for using one compressor to one evaporator or more than one evaporator.

If Qd≧Qm is not true, the controller 30 may compare the outlet pressure Po and the condenser pressure Pc (step 305) for adjusting the flow rate by preventing surge. If Pc≧Po is not true (Pc<Po), there would be no surge problem, and then the controller 30 order the inverter 13 to lower the frequency for lowering the flow rate Qa (step 306) which means the controlling process is finished (step 300), then proceeding step 302. If Pc≧Po is true, there would be a surge problem to be considered. So the controller 30 may compare if Qa≧Qm is true (step 307). Step 307 may confirm whether the flow rate is over the surge envelope (like FIG. 3) for securing the compressor. If Qa≧Qm is true, then proceeding step 308. If Qa≧Qm is not true, then proceeding step 309.

If Qa≧Qm is true, the system may adjust the inlet guide vane 14 (IGV) of the compressor to change an inlet angle and the controller 30 may compare whether the adjusted inlet angle reaches the adjustable limit of the inlet angle (step 308). If the adjusted angle is lower than the limit, then the system may lower the flow rate Qa to Qm. That is to say that the system don't need further step for lowering Po and returns step 305 (step 310). If the adjusted inlet angle reaches the adjustable limit of the inlet angle and the system still can't lower Qa to Qm, then the system may adjust the hot gas bypass (step 311) to open a shortcut from the outlet pipe of the compressor to an outlet pipe of the evaporators for lowering the flow rate Qa. After step 311 is finished, proceeding step 305 and comparing whether Pc≧Po is true.

If Qa≧Qm is not true (Qa<Qm is true) which means Po can't be lowered any more, Tc needs to be lowered (step 309) by adjusting the coil valve to raise the efficiency of the condenser (increasing the length of the working pipe of the condenser) or adjusting a speed of the fan to lower the Tc. When the Tc is lower, Pc can be lower and Qm can also be lower for preventing the surge problem. After step 309, the system may proceed step 305 and compare whether Pc≧Po is true. Moreover, the system may adjust the coil valve and the speed of the fan if the outlet pressure Po is higher than the condenser pressure Pc.

The method of the present invention may have a step of adjusting the controlling valve 40a of the condensate storage 40 based on the compared result between the foregoing steps. For example, if Qa>Qd (the working evaporators don't need so much condensate flow), the condensate storage 40 may storage the surplus condensate. If Qa<Qd, the condensate storage 40 may release the condensate. Such step needn't control compressor or use other step to adjust the flow rate, but may quickly carry enough condensate to the evaporators.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling a compressor connected to a hot gas bypass and having a condensate and an inlet guide vane, comprising the steps of:
   providing a condenser connected to the compressor, and at least one evaporator connected to the condenser;
   measuring an inlet pressure and an outlet pressure of the compressor to obtain a flow rate of the condensate;
   determining a minimum acceptable flow rate and a desired flow rate based on a total number of the at least one evaporator;
   comparing at least two of the flow rate, the desired flow rate and the minimum acceptable flow rate with each other to obtain a compared result;
   controlling the compressor based on the comparing result;
   adjusting the inlet guide vane if the desired flow rate of the condensate is higher than the minimum acceptable flow rate; and
   adjusting the hot gas bypass if the flow rate is higher than the desired flow rate.

2. The method for controlling the compressor according to claim 1, wherein the compressor and the condenser connect a condensate storage having a controlling valve and the method further comprises a step of adjusting the controlling valve based on the compared result.

3. The method for controlling the compressor according to claim 1 further comprising a step of raising a rotor speed of the compressor if the flow rate of the condensate is lower than the desired flow rate.

4. The method for controlling the compressor according to claim 1 further comprising the steps of:
   measuring a condenser temperature and obtaining a condenser pressure according to the inlet pressure, the outlet pressure and the condenser temperature; and
   lowering a rotor speed of the compressor if the desired flow rate is lower than the minimum acceptable flow rate and the outlet pressure is higher than the condenser pressure.

5. The method for controlling the compressor according to claim 4, wherein the condenser has a coil valve and a fan, and the method further comprises a step of adjusting the coil valve and a speed of the fan if the outlet pressure is higher than the condenser pressure.

6. A method for controlling a compressor in a heating-exchanging system having a condenser and a condensate, comprising the steps of:
   measuring an inlet pressure of the compressor, an outlet pressure of the compressor and a condenser temperature;
   measuring a flow rate of the condensate;
   obtaining a condenser pressure according to the inlet pressure, the outlet pressure and the condenser temperature;
   comparing the flow rate with a controlling parameter to obtain a compared result;
   controlling the compressor based on the compared result; and
   lowering a rotor speed of the compressor is lowered if a desired flow rate is lower than a minimum acceptable flow rate and the outlet pressure is higher than the condenser pressure.

7. A method according to claim 6, wherein the flow rate is obtained by measuring the inlet pressure and the outlet pressure of the compressor.

8. A method according to claim 6, wherein the heating-exchanging system includes an evaporator and a condenser connected to the compressor.

9. A method according to claim 6 wherein the controlling parameter is obtained by determining the desired flow rate and the minimum acceptable flow rate.

10. The method for controlling the compressor according to claim 9, wherein the heating-exchanging system includes at least one evaporator connected to the compressor and the condenser, and the desired flow rate is determined based on a total number of the at least one evaporator.

11. A compressor controller in a heating-exchanging system having a compressor and a condensate, comprising:
    a measurer measuring a flow rate of the condensate; and
    a determining device determining a desired flow rate and a minimum acceptable flow rate, wherein the compressor is controlled based on the flow rate, the desired flow rate and the minimum acceptable flow rate; and
    a comparer comparing the flow rate of the condensate and one of the desired flow rate and the minimum acceptable flow rate to obtain a compared result, based on which the compressor is controlled;
    wherein the measurer further measures an inlet pressure, an outlet pressure and a condenser temperature, a condenser pressure is obtained according to the inlet pressure, the outlet pressure and the condenser temperature, and a rotor speed of the compressor is lowered if the desired flow rate is lower than the minimum acceptable flow rate and the outlet pressure is higher than the condenser pressure.

12. The compressor controller according to claim 11, wherein the compressor has an inlet guide vane and connects a hot gas bypass.

13. The compressor controller according to claim 11, wherein the compressor connects an inverter and the inverter connects the compressor controller.

14. The compressor controller according to claim 11, wherein the heating-exchanging system comprises a condenser and at least one evaporator connected to the compressor and the condenser.

15. The compressor controller according to claim 14, wherein the condenser has a coil valve and a fan.

16. The compressor controller according to claim 14, wherein the compressor and the condenser connect a condensate storage having a controlling valve.

17. A method for controlling a compressor having a condensate, comprising the steps of:
    providing a condenser connected to the compressor, and at least one evaporator connected to the condenser;

measuring an inlet pressure and an outlet pressure of the compressor to obtain a flow rate of the condensate;

measuring an inlet pressure and an outlet pressure of the compressor to obtain a flow rate of the condensate;

determining a minimum acceptable flow rate and a desired flow rate based on a total number of the at least one evaporator;

measuring a condenser temperature and obtaining condenser pressure according to the inlet pressure, the outlet pressure and the condenser temperature; and lowering a rotor speed of the compressor if the desired flow rate is lower than the minimum acceptable flow rate and the outlet pressure is higher than the condenser pressure.

* * * * *